Aug. 21, 1923.
A. W. SMITH
ARMREST FOR CLOSED BODIES
Filed April 17, 1922
1,465,491
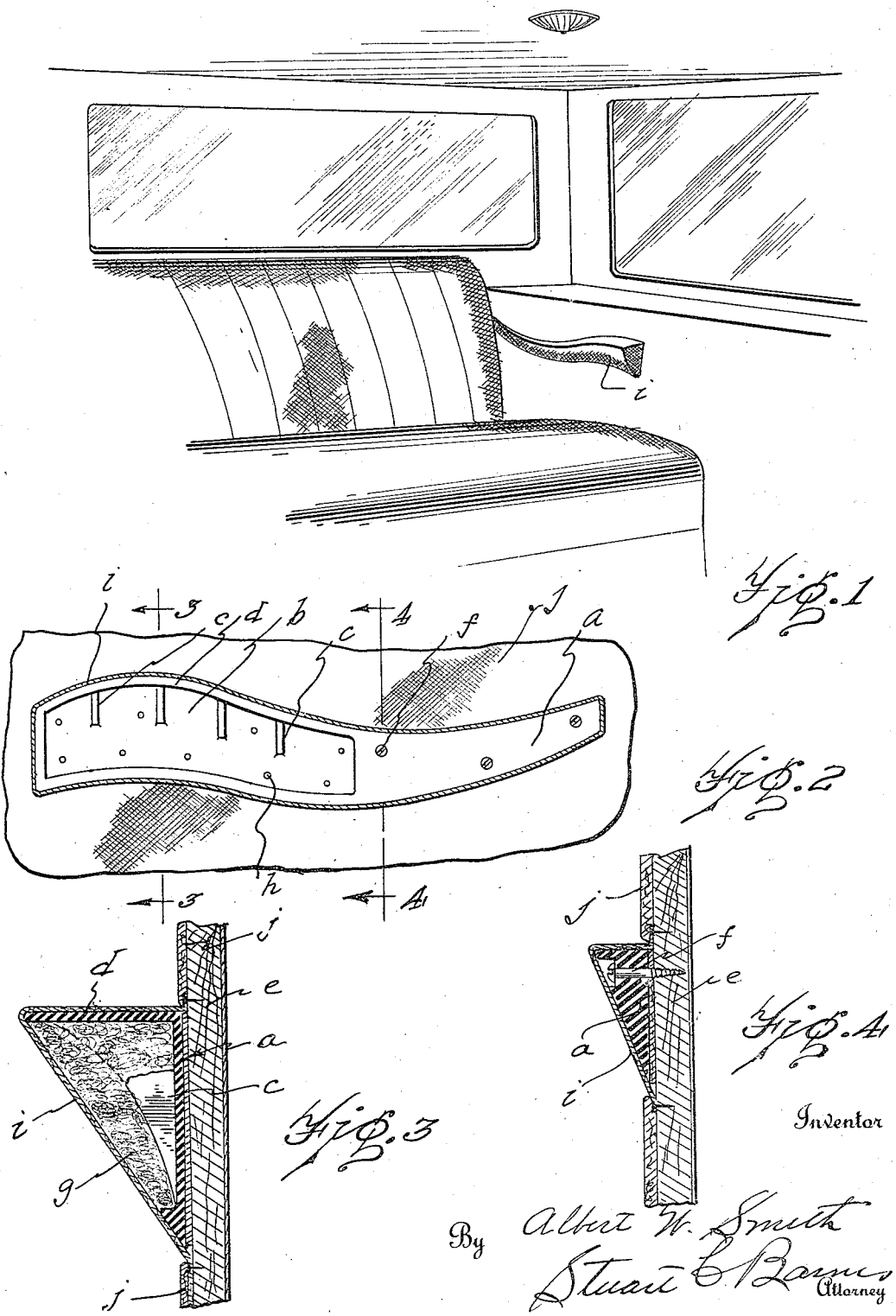

Patented Aug. 21, 1923.

1,465,491

UNITED STATES PATENT OFFICE.

ALBERT W. SMITH, OF DETROIT, MICHIGAN, ASSIGNOR TO FISHER BODY CORPORATION, OF DETROIT, MICHIGAN, A CORPORATION OF NEW YORK.

ARMREST FOR CLOSED BODIES.

Application filed April 17, 1922. Serial No. 554,137.

*To all whom it may concern:*

Be it known that I, ALBERT W. SMITH, a citizen of the United States, residing at Detroit, in the county of Wayne and State of Michigan, have invented certain new and useful Improvements in Armrests for Closed Bodies, of which the following is a specification.

This invention relates to arm rests for closed bodies of automobiles. Arm rests have heretofore been used in closed bodies but they have ordinarily been made by cutting a piece of wood to the shape of the arm rest and securing this to the arm rest board of the car by means of screws, this arm rest is then covered with the usual trimming.

It is the object of the present invention to provide a very much superior arm rest by making the same not only soft and yieldable but relatively distortable. This permits the arm rest to yield with the pressure so that when people are crowded together on the back seat of the car the arm rest will not painfully dig into the one who happens to be next to it.

In the drawings:—

Fig. 1 is a fragmentary prospective of the inside of a closed car showing the arm rest in position.

Fig. 2 is a longitudinal section of the same.

Fig. 3 is a cross section on the line 3—3 of Fig. 2

Fig. 4 is a cross section on line 4—4 of Fig. 2.

The rubber block $a$ is of soft yieldable rubber. This block is preferably moulded rubber and is provided at the front end with a large recess $b$, however, supporting ribs or brackets $c$ are left in the block so as to support the thin top wall $d$ that remains. The unrecessed or rear portion of the strip can preferably be secured to the arm rest board $e$ by screws $f$; the recessed or front portion of the arm rest can be secured to the arm rest board by means of nails $h$. The recess $b$ is stuffed with a high grade of curled hair $g$, as shown in Fig. 3. The arm rest cover $i$ is then tacked to the arm rest board along line of the rubber block. This cover or trimming is drawn tightly over the recess, as shown in Fig. 3 and then drawn tightly up over the recess and sides of the block and over the flexible top wall $d$ being tacked along the top line of the block to the arm rest board. The usual body trimming $j$ is then secured to the arm rest board and over the raw edges of the arm rest cover completely concealing this.

It will be obvious that the rubber block furnishes a relatively solid smooth form for the arm rest and is easily distortable under pressure. This is especially so when the recess $b$ is employed and is stuffed with hair so that it will have a yielding pillow.

What I claim is:

1. In a vehicle body, the combination of a seat provided with a seat back and seat bottom and an arm rest board located at the end of the seat and an arm rest comprising a block of soft distortable rubber secured to the side of the arm rest board and spaced from the top of the seat bottom.

2. In a vehicle body, the combination of a seat provided with a seat back and a seat bottom and a vertical arm rest board located at the end of the seat and an arm rest comprising a long and narrow block of soft distortable rubber secured to the side of the arm rest board and spaced from the top of the seat bottom.

3. In a vehicle body, the combination of a seat provided with a seat back and seat bottom and a vertical arm rest board at the end of the seat and an arm rest secured to the vertical arm rest board and comprising a recessed rubber block spaced from the top of the seat bottom.

4. In a vehicle body, the combination of an arm rest board, and an arm rest secured to the side thereof and comprising a block of distortable material recessed at the front and below the top of the same.

5. In a vehicle body, the combination of an arm rest board, and an arm rest secured thereto and comprising a moulded rubber block having at the forward end a recess reaching short of the top of the block and having ribs or brackets for supporting the remaining top wall above the recess.

6. In a vehicle body, the combination of an arm rest board, and an arm rest secured thereto and comprising a block of distortable material having a recess to leave a pliable top wall and yieldable stuffing in said recess.

7. In a vehicle body, the combination of an arm rest board, and an arm rest secured thereto and comprising a rubber block provided at the forward end below the top with a recess, yieldable filling material stuffed in the recess and a cover drawn over the rubber block and the filling material.

8. In a vehicle body, the combination of an arm rest board, and an arm rest secured thereto and comprising a distortable rubber block provided with a recess running longitudinally of the same at the forward end and below the top, leaving a pliable flexible top wall, curled hair stuffed in the said recess and a cover drawn over said block and curled hair.

9. In a vehicle body construction, the combination of a seat having a seat bottom and at the end of the seat a vertical arm rest board, and a relatively long and narrow arm rest secured to the vertical arm rest board and having a core provided with a distortable but elastic member that forms a frame or outline for the arm rest.

In testimony whereof I affix my signature.

ALBERT W. SMITH.